(12) United States Patent
Maksymowicz (10) Patent No.: US 7,301,134 B2
(45) Date of Patent: Nov. 27, 2007

(54) ELECTRO-OPTICAL FOCAL PLANE ARRAY DIGITAL SENSOR SYSTEM

(75) Inventor: John Maksymowicz, Long Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 67 days.

(21) Appl. No.: 11/177,682

(22) Filed: Jul. 7, 2005

(65) Prior Publication Data

US 2007/0007436 A1    Jan. 11, 2007

(51) Int. Cl.
*H01L 27/00* (2006.01)
*G01J 1/42* (2006.01)
*H04N 3/14* (2006.01)

(52) U.S. Cl. .............. 250/208.1; 250/208.2; 348/301; 348/302

(58) Field of Classification Search ............ 250/203.6, 250/559.35, 206.1, 208.1, 208.2, 208.4; 398/118, 398/120, 122, 130, 131; 348/301, 302; 358/463, 358/466
See application file for complete search history.

(56) References Cited

U.S. PATENT DOCUMENTS

| 4,908,875 A | * | 3/1990 | Assael et al. ............... 382/272 |
| 5,452,004 A | * | 9/1995 | Roberts ...................... 348/301 |
| 5,717,208 A | * | 2/1998 | Woolaway, II .............. 250/332 |

* cited by examiner

*Primary Examiner*—Georgia Epps
*Assistant Examiner*—Don Williams
(74) *Attorney, Agent, or Firm*—Derrick Michael Reid

(57) ABSTRACT

A laser beam detection and tracking system includes a focal plane array sensor providing pixel data and a field programmable gate array controller receiving the pixel data for determining a centroid of the illuminating spot of the impinging laser beam and for determining variably sized windows of interest disposed around the spot for selecting a subset of pixels of the array for communicating a subset of the pixel of a window frame of data from the array to the controller for increasing the array frame rate for reducing laser jitter during tracking of the beam for improved beam tracking performance.

20 Claims, 2 Drawing Sheets

LASER DETECTION AND TRACKING SYSTEM

LASER DETECTION AND TRACKING SYSTEM

FIG. 1

FOCAL PLANE ARRAY

FIG. 2

ELECTRO-OPTICAL FOCAL PLANE ARRAY DIGITAL SENSOR SYSTEM

FIELD OF THE INVENTION

The invention relates to the field of laser beam detection and tracking. More particularly, the invention relates to processing pixel data from a focal plane array receiving a laser beam that can be a satellite laser light beam that is tracked by a tracking system for keeping the laser beam within the focal plane array.

BACKGROUND OF THE INVENTION

Space-based laser communication systems establish and maintain constant spatial orientation between satellites for providing a continuous closed-loop communications link. A ground system will search for a space system initiating a laser communication link with the ground system. The space system directs a laser beam at an electro-optical focal plane array sensor of the ground system. A focal plane array is known as an imaging sensor. A detected pixel is a pixel having a magnitude value of pixel data exceeding a detection threshold level. The pixel data is a decimal value of the magnitude of the impinging light on a pixel in the array. The pixel data is a decimal value equal to or exceeding the predetermined detection threshold level. Pixel data is typically any number of N parallel bits. The pixel data is typically used to establish and maintain a communications link. The ground system must acquire, detect and then track by signal processing the laser beam of the space system in a continuous and closed-loop process. The ground system acquires continuous frames of image data as long as the laser is impinging the sensor. Each frame may consist of millions of pixels. Each pixel is associated with a respective row and column in the focal plane array. These systems may be space satellites. Two satellites may attempt to initiate, establish, and maintain an efficient and optimal laser communication link. Each satellite must be able to independently sense and acquire the presence of the laser light. That is, each satellite must be able to detect the laser light to initiate a communications link, and subsequently maintain continuous tracking of that laser light originating from the satellite attempting to initiate the communication link to ensure unbroken connectivity of that link. The sensor may be a complementary metal oxide semiconductor (CMOS) focal plane array, which would be continuously scanning a portion of space within a field of view searching for the laser beam where the satellite may be positioned. Once a laser signal, originating from the space satellite, impinges on the photodetector array surface of the imaging sensor of the ground system, output data from that sensor can then be processed by a signal processing system. The output data from the signal processing system would then be sent to a positing controller for commanding a pointing mechanism to move the sensor field of view as the sensor is continuously moved so as to continuously track the laser beam. Continuing technological advancements in satellite imaging sensors are now making these focal plane array sensors much larger with multi-mega pixels. The sensors have more complex structures and operate at even faster data rates, which places further stringent performance requirements on signal processing speeds to attain faster pointing response times, more precise pointing command resolution, and ever faster closed loop system response times.

The beamwidth of the impinging laser beam is affected and influenced by space phenomenology. The laser beam propagates from the originating satellite where the laser beam originates, to the receiving satellite on which the focal plane array imaging sensor resides. The spot beam is affected by physical interaction of the impinging laser beam with the surface of the imaging sensor, and any related and ensuing motion between the impinging laser beam and sensor surface. This motion is laser jitter and disadvantageously affects the ability of a tracking system to smoothly track the laser beam source.

The positioning of the sensor operates by continuous closed-loop control. That is, the signal processing system continuously accepts the imaging sensor outputs to calculate and update the impinging laser light on respective X and Y Cartesian coordinate centroid locations with respect to the illuminated spot of laser light illuminating individual pixels of the focal plane array. The signal processing system then outputs pointing commands to the positioning controller for controlling the pointing mechanism. In this way, continuous tracking of the impinging laser is maintained. When no laser beam is impinging on the focal plane array, the signal processing system is still accepting and processing inputs from the focal plane array while the focal plane array is continuously scanning over the field of view while awaiting for the arrival of a laser signal. When no laser beam is received, the pointing mechanism receives no updated pointing commands from the signal processor system so the focal plane array remains fixed in the position or the signal processing system can enter a scanning mode searching for a signal.

Various sensor control systems have been used. U.S. Pat. No. 6,469,815 teaches utilizing a quadrant sensor that is a multi-channel photo-detector. Each of the four sensor quadrants requires a dedicated processing channel. The received laser signal also requires conversion into electrical signals and threshold circuits, which supply thresholds for the converted electrical signal to be compared against. This system is for acquisition of the laser signal only. The spacecraft requires a second sensor to perform laser tracking. U.S. Pat. No. 6,522,440 also teaches the use of a four-quadrant photo-detector and respective channel processing circuitry and fine laser tracking is accomplished by relative power comparisons. U.S. Pat. No. 5,142,400 teaches two different sensors in a transceiver using a matched pair of reflecting telescopes and processing electronics and software for the comparison of two different optical beams for detection, acquisition, and tracking of the laser. U.S. Pat. No. 5,973,310 teaches three embodiments necessitating the use of binning of signals received from the imaging sensor. In the case the imaging sensor, the sensor is a charged coupled device. The sensor requires the use of a modified discrete Fourier transform of the binned signals and phase relationships. The sensor requires a finite impulse response transform with phase relationships, requires the collection of N image samples of the binned signals and calculation of an error angle, and lastly requires an iterative and repetitive methodology used for reducing window size until the signal is located. U.S. Pat. No. 6,556,324 teaches the use of separate sensors for the respective acquisition and tracking functions as well as three assemblies to implement the functions of point ahead, coarse, and fine pointing. U.S. Pat. No. 4,979,221 teaches a system where pixel data is used to create respective binary addresses for locating a given pixel on a charge coupled device array and sub-pixel centroiding. U.S. Pat. No. 5,517,016 teaches the storage and comparisons between three stored sets of collected pixel brightness magnitude data for further processing as well as requiring the determination of a relative angle between receive and transmit laser beams. U.S. Pat. No. 5,517,016 teaches the use of multiple radial compare window frames of data and uses a number of pixels to make logic decisions. U.S. Pat. No. 5,592,320 teaches scanning logic, scan controller, and signal processor elements as segregated system elements.

These cited patents teach that separate sensors are required for implementing the respective laser acquisition and tracking functions. The cited patents teach individual sensors necessitate additional processing hardware. The cited patents teach software and logic resources required for the acquisition sensor to cue the tracking sensor while incurring increased system size, weight, power, thermal control, and complexity. The cited patents teach the use of additional hardware and software for storage and preprocessing of sensor data for centroid processing and calculations, teach expensive and complex optical signal processing and components, optical beam power splitting, and optical beam power measurements. The optical components are sensitive to space radiation and thermal environments, suffer aging effects, maintaining mechanical alignment and calibration is critical. The cited patents also teach custom and fixed nonmodifiable system designs for any given satellite. The cited patents teach hardware intensive based implementations rather than reprogrammable software. The cited patents teach hardware intensive implementations require more control and monitoring by the signal processing system that has overall responsibility for the control and monitoring the functions of all other individual subsystems that make up the total satellite. The cited patents also teach centroid calculations used for data comparing and repetitive, iterative processes to eventually converge on X and Y values, rather than operating in real-time, or on-the-fly mode of operation.

There are critical problems with the teachings of the cited references. The operational limitations and shortfalls are due to slow signal processing and the obtainable precision of the pointing commands that the signal processing system uses to generate for the pointing commands. This signal processing time directly impacts the sensor positioning and repositioning response time that is defined as the time required for the sensor pointing mechanism and positioning controller to accept and respond to new pointing commands and to then point to that commanded location. The sensor pointing response time is extremely critical, as the response time is a dominant factor to ensure a continuous and highly accurate tracking of the impinging laser beam. Typical values of signal processing time, as measured between the signal processing mechanism accepting inputs from the imaging sensor, calculating the X and Y Cartesian coordinate centroid values to the final output of pointing commands to the sensor's pointing mechanism and positioning controller is on the order of milliseconds. Slow signal processing time and inadequately low pointing resolution of the generated pointing commands are problems of the closed-loop system response. In considering the imaging sensor, the signal processing mechanism and the sensor pointing mechanism and positioning controller as a single, closed-loop system, the overall system response of the closed-loop system is approximately on the order of 30.0 Hz. This overall response time is too slow and as such, will not accommodate the requirements of advanced imaging sensors.

Another problem is that the prior systems do not implement an efficient and optimal use of the imaging sensor built-in and primary operating feature. This feature is called the frame rate. Satellite imaging sensors with focal plane arrays, operate in one of two modes. When the focal plane array is operating in the full frame mode, all the individual pixels of that focal plane array surface are examined for any impinging laser light. This scanning process is done internally by the focal plane array internal electronics. The focal plane array will output pixel data and specialized control signals whether a laser is impinging the surface or not. When no laser light is present, then the pixel data is then zero. The specialized control signals will be different for each of the focal plane arrays made by respective manufacturers. These specialized control signals are used for timing control and sequencing for signal processing of the focal plane array pixel data. The full frame mode is typically used for laser signal detection and acquisition, when the focal plane array is initially staring into a field of view while waiting for a laser signal to impinge on the array. The second mode of focal plane array operation is a window of interest mode. The window of interest mode is predefined a priori within the signal processor to output a smaller N×N pixel subset of the focal plane array pixels. The cited references teach, in terms of speed, accuracy and precision, a signal processor that reduces the full scan to a fixed-sized window of interest of a fixed number of pixels. As such, the scanning limits system response time.

Another problem with prior system is the use of quadrature photodetector cells as an imaging sensor, be it for either for laser detection, acquisition or tracking functions. These quadrature photodetector cells devices offer a very limited small field-of-views in terms of how much space the sensor can scan through at any given time and the outputs from these quadrature photodetector cells devices are error signals. Error signals only provide the signal processor with limited data in which even further processing is required, which then allows a less precise coarse laser tracking function. Quadrant detectors or quad cells have been the principal means of achieving precise sensing of laser beams within an acquisition and tracking scheme. A drawback to a quad cell implementation is a highly restricted field of view for the four cell quadrant detectors. Precise optical alignment between the sensor and laser beam line-of-sight is not always achievable. The use of wide-angle field-of-view detectors allows for simplification of apparatus design and a decreased latency associated with switching between acquisition and tracking.

The use of a two-dimensional CMOS focal plane array as a detector device, exhibits superior performance for certain region-of-interest as compared to the equivalent charge coupled device detector arrays. Current advances in submicron feature CMOS technology have been exploited by developers of visible detector arrays to provide features, such as micron sized pixel dimensions, random access readout and image windowing, which are not available using alternate detector implementation approaches. For example, the ability to address individual pixels in a CMOS focal plane array enables dynamic switching to a selected region-of-interest, or a localized area of processing, with readout supported at high frame rates. In this case, the digital processing capability nominally used for an array of 1000× 1000 pixels can be applied to a smaller field of view, for example to a 10×10 pixel area in order to support a significantly higher readout rate. For one example, a sub-array frame rate of 1000 frames per second (fps) is sought in order to close the sensing loop with a fast steering mirror as the actuator. The overall objective is to close the loop in a high bandwidth pointing and tracking test bed. The test bed will be used to test several performance metrics associated with a pointing acquisition and tracking scheme for orbital laser communications.

In particular, CMOS technology is allowing for more capable sensing and processing of data in a location removed from the host computer. The applications for CMOS detectors are increasing rapidly. However, only a few of the publications consider the application of these devices to spacecraft or space-borne systems. The reason appears to be the susceptibility of visible bandwidth CMOS focal plane array devices to total dose ionizing radiation damage, as well as proton displacement damage resulting in increased photodiode dark current. However, CMOS device scaling to sub-micron feature sizes have generally increased radiation hardness capability of both the CMOS circuitry as well as the photodiodes to much higher levels than those reported in the past. The goal of this test bed construction is to provide a means for independent analysis and application specific testing of visible silicon detector arrays with high-frame-rate readout and with region-of-interest capabilities.

The systems of the cited references disadvantageously require multiple sensors and processors, require sensor data pre-formatting and processing, have sensor limited field-of-view and poor output data, have slow millisecond pointing responses, have low pointing resolution in milliradians, do not process data in near-real time, require additional processing for laser jitter mitigation, are unable to reprogram internal sensor operations in near-real time, and require costly and complex optical technologies. These and other disadvantages are solved or reduced using the invention.

SUMMARY OF THE INVENTION

An object of the invention is to provide a system for determining a window of interest encompassing a spot of a laser beam impinging on a focal plane array.

Another object of the invention is to provide a system for determining a window of interest encompassing a spot of a laser beam impinging on a focal plane array for increase frame rates pixel data from the focal plane array.

Another object of the invention is to provide a system for determining a window of interest encompassing a spot of a laser beam impinging on a focal plane array and for calculating a centroid of the spot.

Yet another object of the invention is to provide a system for determining an adaptable window of interest encompassing variably sized spots of a laser beam impinging on a focal plane array.

Still another object of the invention is to provide a system for determining a window of interest of a spot of a laser beam impinging on a focal plane array for calculating centroids of the spot for generating pointing commands for pointing the focal plane array towards a source of the laser beam.

A further object of the invention is to provide a detection and tracking system for tracking a satellite transmitting a laser beam by determining a window of interest encompassing a spot of the laser beam impinging on a focal plane array and for determining a centroid of the spot for generating pointing commands for pointing the focal plane array towards the satellite.

The invention is directed to a focal plane array sensor system for receiving pixel data from a focal plane array sensor having a focal plane array and for determining a window of interest within the focal plane array. The window encompasses detected pixels illuminated by a laser beam. The size of the window of interest is determined to encompass the impinging laser light. The window of interest size is less than the full size of the array, so that, window frame rates are greater than full scan frame rates of the entire focal plane array. The increased frame rates improve system tracking performance and reduces jitter of focal plane array positioning pointing mechanisms. The system detects those pixels that are being illuminated by the laser spot. The system subsequently commands the sensor by a window command to output only pixel data for only those pixels within the window of interest within the entire focal plane array so as to only communicate the pixel data within the window of interest within the full array. The window commands to the sensor by a controller reduces the window of interest and increases the frame rates. Reducing the window of interest controls the sensor to output only pixel data of interests while increasing the frames per second rate. The increase frame rate reduces laser jitter in real time. When there are no detected pixels within the window of interest, the controller 20 reacquires the spot by issuing a window command to fully scan the entire array searching for detected pixels. The window of interest is also adaptively variably sized to encompass the spot beam by predetermined margins about the spot. The window margins are set to size the window in terms of a number of beam widths to meet predetermined jitter specifications. These and other advantages will become more apparent from the following detailed description of the preferred embodiment.

DETAILED DESCRIPTION OF THE PREFERRED EMBODIMENT

Figure 1:
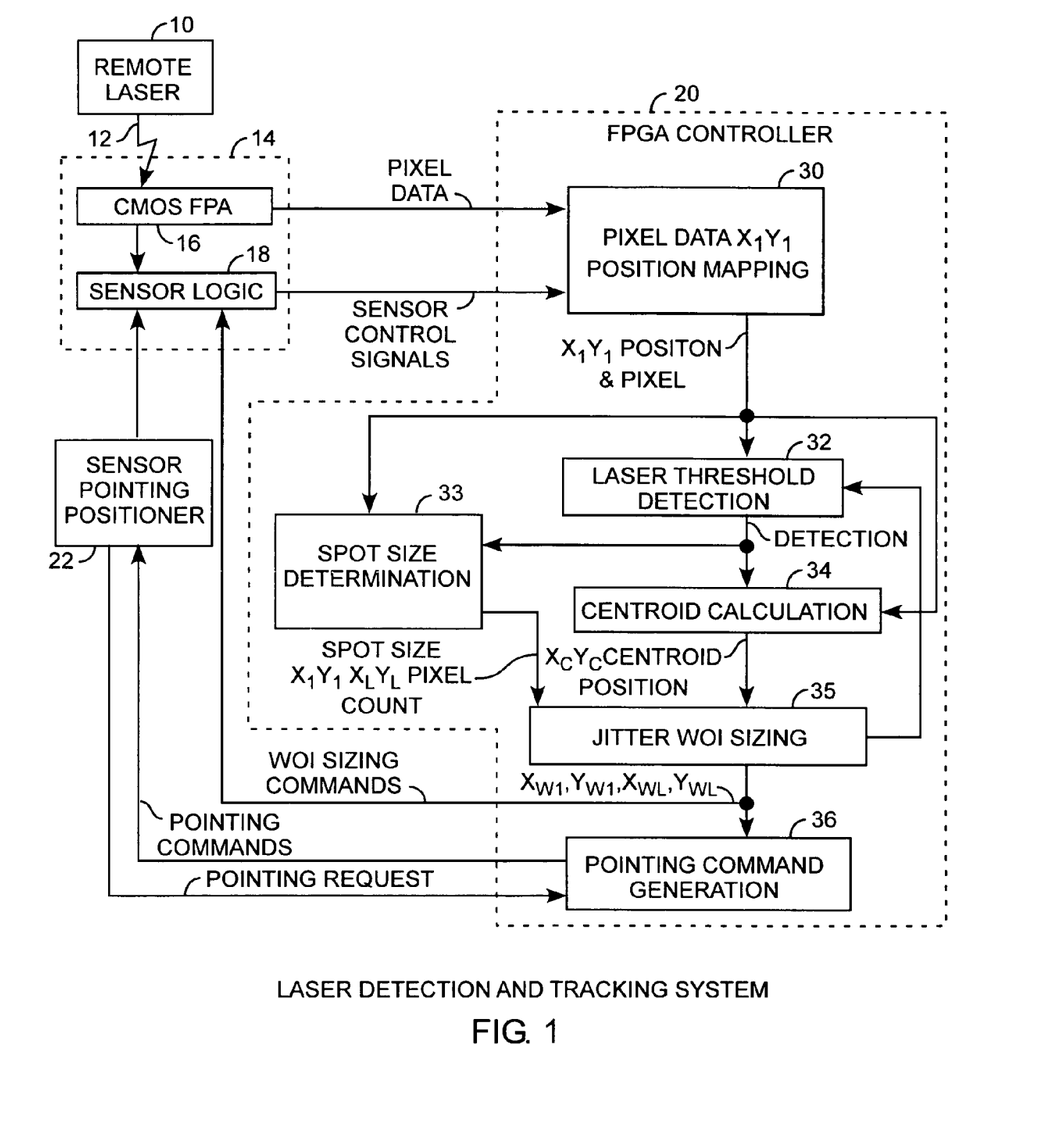
FIG. 1 is a block diagram of a laser detection and tracking system.
Figure 2:
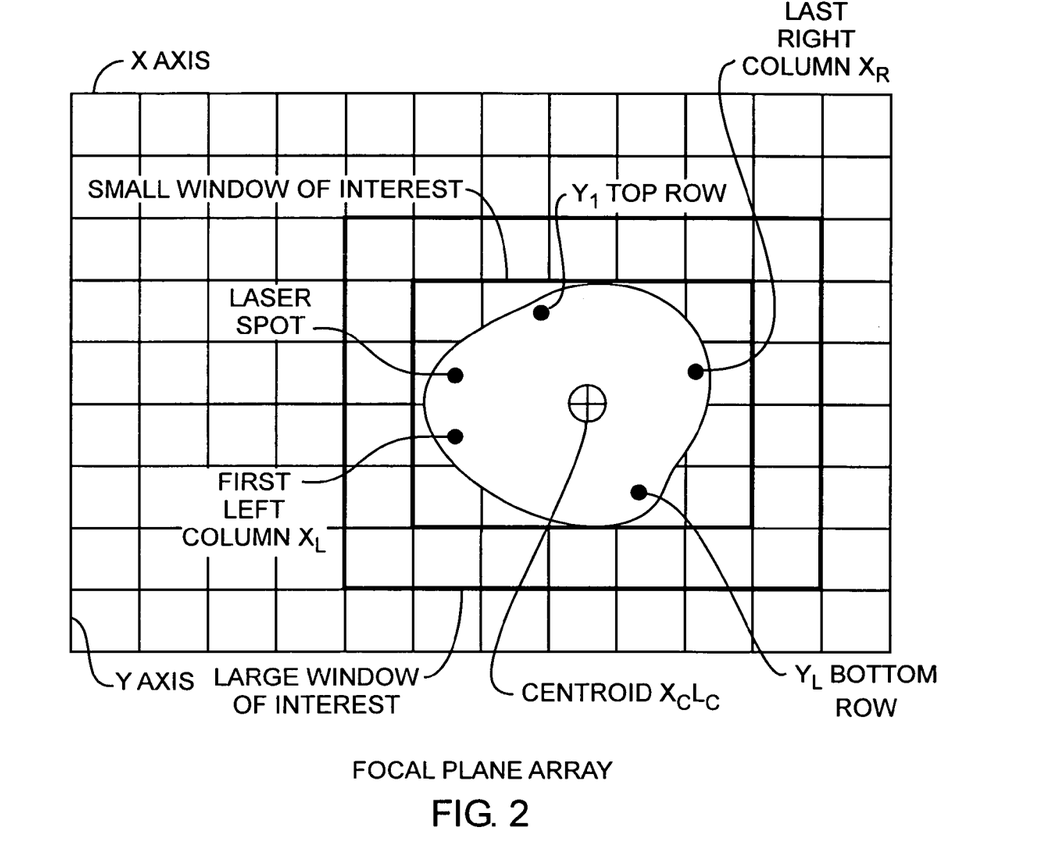
FIG. 2 depicts a laser spot in a window of interest in a focal plane array.

An embodiment of the invention is described with reference to the figures using reference designations as shown in the figures. Referring to the Figures, a laser detection and tracking system is used to track a remote laser 10 as a source of a laser beam 12. The laser 10 may be disposed on an orbiting satellite and the laser detection and tracking system may reside in a ground tracking station or a second satellite. The laser beam 12 impinges upon a focal plane array (FPA) sensor 14 including a CMOS focal plane array 16 and sensor logic 18 for respectively communicating pixel data and control signals to a controller 20 that is preferably a field programmable gate array (FPGA). The controller 20 functions as a window controller for the sensor 14. The sensor 14 may be a satellite or ground station electro-optical sensor used to detect and continuously track the laser beam 12. The gate array controller 20 can be configured using VHSIC hardware description languages for embedded processing and control algorithms that implement real-time operations for the detection and continuously tracking of the beam 12 with high precision and speed. The controller 20 is preferably an FPGA segmented into process functions acting upon the focal plane array control signals and pixel data. The controller 20 generates window of interest commands communicated to the FPA 14 and for generating pointing commands communicated to a sensor pointing positioner 22 for pointing the FPA 14 towards the remote laser 10 so as to maintain the beam 12 within the FPA 14.

The FPGA controller 20 is preferably segmented into six functions including pixel mapping 30, pixel detection 32, spot size determination 33, centroid calculation 34, widow sizing 35, and pointing command generation 36. The FPGA 20 includes algorithms 30, 32, 33, 34, 35, and 36 that can be modified for hosting onto any family of FPGA 20 so long as the respective FPGA is large enough with a minimum number of logic gates to host the combined algorithms. The FPGA 20 and hosted algorithms can be used on any spacecraft that utilizes a focal plane array 16 as an imaging sensor. Multiple copies of the FPGA algorithms 30, 32, 33, 34, 35, and 36 may be hosted on a single FPGA controller 20 with sufficient logic gates to allow a single FPGA to process data from multiple focal plane arrays 16. The embedded FPGA algorithms 30, 32, 33, 34, 35, and 36 are all generated by interconnecting gates of the FPGA preferably as very high dense digital logic (VHDL) algorithms.

The FPGA controller 20 maps 30 the received pixel data to X and Y Cartesian coordinates with a respective magnitude. The FPA array 16 is typically configured as a rectangular X by Y array with each pixel defined by a row X and a column Y in the array 14. The pixel data includes an X column location, a Y row location, and an M magnitude for each pixel of the array 14. The pixel data mapping algorithm 30 enables pixel data mapping 30 of the array 14× and Y location to X and Y Cartesian coordination associating X and Y coordinates within a window to an illumination magnitude value for each pixel. The mapping 30 preferably uses two numerical counters for counting pixel data. A Y counter counts rows. An X counter counts columns. An exemplar focal plane array 16 has a total of 1024 rows and 1280 columns. A row counter counts sequentially from row one to row 1024. Likewise, a column counter sequentially counts from column one to column 1280. As the focal plane array 16 generates the pixel data, the sensor logic 18 internally scans the photodetector FPA array 16 on a per row basis as in a raster scan. That is, the sensor logic 18 of the sensor 14 starts scanning the photodetector focal plane array 14 for an impinging laser beam beginning with row one at column one and scans through the 1280 columns. After column 1280 has been scanned, the sensor logic 18 begins scanning row two from columns one through 1280. Once the sensor 14 completes the scan of column 1280, of the last row 1024 of the array 14, the logic 18 then continuously repeats this raster scan process, beginning again with row one at columns one through 1280. The sensor control signals from the sensor logic 18 enable the communication of the pixel data from the sensor 14 to the FPGA 20. The control signal can be used to clock the X and Y counters as pixel data is received. The FPGA 20 mapping algorithm 30 includes sequencing and timing control, not shown, that replicates the focal plane array 16 internal scanning. X and Y counter outputs during mapping 30 are the X and Y coordinates within the FPA 16 that also may be X and Y coordinates with a window of interest. As such, the mapping algorithm 30, using counters during a window raster scan, and operates to map the incoming pixel data to X and Y coordinates in real-time to a window of interest. The focal plane array pixel data and control signals are continuously input to the FPGA 20 while the pixel data is mapped to the window of interest in real-time.

The controller 20 then detects 32 illuminated pixels as detected pixels. The pixel data for each pixel is mapped to the X and Y Cartesian coordinates. The pixel magnitudes are then compared 32 to a laser threshold for determining detection of illuminated pixels. The laser detection algorithm 32 compares the associated pixel magnitudes to a predetermined threshold value. As each pixel is mapped, the X and Y coordinates and M magnitude values are fed to the laser detection algorithm 32 that compares in real time the decimal value of the magnitude to the a priori predetermined threshold level that is also preferably a decimal value. This magnitude detection threshold value can be a permanently fixed predetermined value or an adaptable value that can be programmable via external commands, or change by internal criteria. For example, when the number of detected pixels within a window of interest is small and less than a predetermined minimum number of detected pixels, the magnitude detection threshold value can be automatically decreased so as to increase the number of detected pixels within the window. Likewise, when the number of detected pixels within a window of interest is large and greater than a predetermined maximum number of detected pixels, the magnitude detection threshold value can be automatically increased to decrease the number of detected pixels. In this manner, the array 20 can provide pixel data that is translated into spot sizes within a range of predetermined spot sizes, for consistent and normalized operation during use.

The controller 20 then determines 33 a spot size. The spot size determination 33 maintains a detection counter that counts the number of pixels having an illumination magnitude greater than the predetermined threshold value. The detection 32 sends detection signals D, and X and Y coordinates to the spot size determination algorithm 33. The spot size determination algorithm 33 counts pixel detections. The spot size is determined by associating X and Y coordinates with a corresponding detection indication. The spot size is derived from a first pixel at row $Y_1$, a last pixel at row $Y_L$, as well as a right most pixel in a right most column $X_R$, and a left most pixel at a left most column $X_L$. That is, the spot size is defined as N number of detected pixel, and may further include spot shape data. The spot size determination 33 preferably indicates the shape of the spot. The shape may be determined by a first top row $Y_1$ of a first detected pixel of a raster scan, a last bottom row $Y_L$ of a last detected pixel of a raster scan, a left most column $X_L$ of a left most detected pixel, and a right most column $X_R$ of a right most detected pixel or a raster scan. The spot size N, and the spot shape $X_R$, $X_L$, $Y_1$, and $Y_L$ are communicated to the window of interest sizing algorithm 35 for determining a window of interest size. The spot size determination algorithm 34 may receive X and Y coordinates directly from the mapper 30 while receiving associated detection signals from the laser detection algorithm 32 for determining a spot size.

When individual pixel magnitudes are equal to or greater than the predetermined detection threshold value, the decimal value of the pixel data is communicated to the centroid calculation algorithm 34 for calculating X and Y centroid values. The laser detection algorithm 32 and the spot size determination algorithm 33 operates on every pixel every clock cycle, which allows pixel processing on a real-time basis.

The controller 20 then calculates 34 the X and Y Cartesian coordinate centroid $X_C$ and $Y_C$ of the impinging laser beam 12. The laser centroid calculation algorithm 34 also receives each individual detected pixel M magnitude that preferably exceeds the predetermined threshold value. The centroid is computed using two $\overline{X}$ and $\overline{Y}$ centroid equations for computing $\overline{X}$ and $\overline{Y}$ centroids.

$$\overline{X}_{Centroid} = \frac{\sum_{1}^{k}\left(\frac{\sum_{j=1}^{n}\left(\sum_{i=1}^{m} \text{Pix\_Val}_{ij}\right)i}{\sum_{j=1}^{n}\sum_{i=1}^{m} \text{Pix\_Val}_{ij}}\right)}{k}$$

-continued $$\overline{Y}_{Centroid} = \frac{\sum_{1}^{k}\left(\frac{\sum_{i=1}^{m}\left(\sum_{j=1}^{n}\text{Pix\_Val}_{ij}\right)j}{\sum_{i=1}^{m}\sum_{j=1}^{n}\text{Pix\_Val}_{ij}}\right)}{k}$$

In the $\overline{X}$ and $\overline{Y}$ centroid equations, Pix_Val is the respective magnitude M of detected pixels, the subscripts i and j represent the individual column i-th number and j-th row number for the pixel being inputted into the respective centroiding equations. The $\overline{X}$ and $\overline{Y}$ centroid calculations are made, and updated on a real-time basis. That is, every time a detected pixel is received, new values of the $\overline{X}$ and $\overline{Y}$ centroid are calculated. The $\overline{X}$ and $\overline{Y}$ centroid calculation algorithm 34 operates on a real-time basis in that only those pixels which were passed to it from the laser detection algorithm 32 are processed. When a current pixel is not detected as a detected pixel, then the centroid calculation algorithm 34 remains idle and maintains the last calculated values waiting for data for the next detected pixel. Further updated values are calculated only when detected pixel data is inputted. When an impinging laser beam only illuminates an extreme edge of the focal plane array 14, such as in the most upper or lowest row, or the extreme left or right column of the array is illuminated, no adverse effect occurs in the centroid computation. The centroid algorithm 34 performs the centroid calculations without edge effects.

The FPGA controller 20 then computes 35 the size of the window of interest (WOI). The size of the WOI may be defined by a first left column $X_{W1}$, and first top row $Y_{W1}$, a last right column $X_{WL}$, and a last bottom row $Y_{WL}$. The window of interest sizing algorithm 35 receives the spot size including the N number of detected pixels, the left most column $X_L$, the right most column $X_R$, the first top row $Y_1$, and the last bottom row $Y_L$. The WOI $X_{W1}$, $Y_{W1}$, $X_{WL}$, and $Y_{WL}$, data becomes window sizing commands communicated to the sensor logic 18 to limit the sensor scan to a window of interest scan while the pixel data output is limited to the window of interest within the array 14. The window is sized so as to encompass at least the center $X_C$ and $Y_C$ position of the laser spot. Preferably, the window of interest is at least a small window of interest encompassing the laser spot bounded by the spot shape $X_R$, $X_L$, $Y_1$, and $Y_L$. The window of interest is preferably larger than the detected spot size with a large window of interest encompassing the spot shape by $X_R$, $X_L$, $Y_1$, and $Y_L$ in addition to a window margin. The difference between the small window and the large window is the margin. A top margin, a bottom margin, a left margin, and a right margin are preferably equal to each other in terms of pixels. That is, the WOI $X_{W1}$, $Y_{W1}$, $X_{WL}$ and $Y_{WL}$ is communicated as a command to the sensor 14 that then limits the pixel data to pixels within the WOI. The limited scan and pixel data increase the frame rate of the sensor 14 from a full scan when the window is sized to the full array to a window scan when the window is sized to be less than the full array. When the window is sized to be less than the full array, the full-scan frame rate increases to a window scan frame rate. The increased frame rate provides for improved smooth tracking of the beam 12. The window margin can be predetermined or adaptively changed. For example, the window margin and detection threshold can be set so that a predetermined number of beam widths can fit within the window of interest. For example, at a given detection level, the left column and right column may be three beam width wide being three times wider than the pixel distance between a left most detected pixel to a right most pixel. In so doing, the beam can move across the window without injecting jitter of the window in the event of a jittering pixel having a magnitude value jittering about the detection threshold value. The controller can be made to receive an updated jitter specification while in use. That is, the WOI sizing algorithm 35 can increase the WOI by the predetermined margin for jitter reduction on the fly. The WOI can be determined by a variety of algorithms. Preferably, the WOI is determined from the left most column $X_L$, the right most column $X_R$, the first top row $Y_1$, the last bottom row $Y_L$. The window margin is specified in pixels and can be any number of +/−pixels. For example, when window margin is one pixel, the WOI is computed to be defined by a left column $X_L$ minus one column to the left, a right column $X_R$ plus one column to the right, a top row of $X_1$ plus one row toward the top, and a bottom row $X_L$ plus one more row at the bottom. The window margin can be made to be adaptable and changed while in operation to flexibly fit various jitter specifications.

The pointing positioner 22 is continuously controlled, in real-time and in a closed-loop. The WOI is preferably centered about the centroid $X_C$ and $Y_C$. The size of the WOI can be increased to include a variably sized window margin. The window margin of a predetermined size reduces jitter of the illuminated pixel as well as reducing jitter in pointing the sensor 14 by the positioner 22. The pointing algorithm 36 controls the output timing of the pointing commands sent to the sensor pointing positioner 22. The pointing algorithm 34 always holds the most current calculated value of $\overline{X}$ and $\overline{Y}$ centroids computed by the centroid calculation algorithms. The $\overline{X}$ and $\overline{Y}$ centroid outputs define a center pixel $X_C$ and $Y_C$ that are X and Y Cartesian coordinates centroid values of the impinging laser spot upon the focal plane array 14.

The pointing command from the pointing algorithm 36 allows the positioner 22 to maintain continuous, high-speed and precise microradian and picoradian pointing resolutions for tracking of the impinging laser beam 12 maintained within array 16. The $\overline{X}$ and $\overline{Y}$ centroid outputs of each centroiding calculation are effectively pointing commands. The pointing command provides coordinate direction and a number of pixels by rows and columns. The pointing positioner 22 is commanded to rotate the focal plane array 16 for the focal plane array 16 to be able to continuously and precisely track the laser beam 12. The $\overline{X}$ and $\overline{Y}$ values are digital pointing commands. The pointing algorithm 36 may be modified so that the output $\overline{X}$ and $\overline{Y}$ centroid outputs may be based upon either a per frame basis, or averaged over a preassigned number of frames. Further, the controller 20 could be modified to receive requests from the positioner 22 to controller for an updated centroid pointing command. The system could be modified so that the FPGA controller 20 receives requests from the positioner 22 when the positioner sends a request signal to the FPGA controller 20 requesting updated pointing commands. In this manner, the pointing algorithm 36 is adaptable to existing pointing positioners providing requests for pointing commands. The pointing command and window sizing commands are adjusted to keep the incoming laser beam 12 near the center of the focal plane array 16 so as to position the illumination spot within the WOI and about the center of the FPA 16.

The system is directed to a FPA controller that enables tracking of a laser beam that could be used for satellite laser communications. For the algorithms 30, 32, 33, 34, 35 and 36 operate as a FPA controller. The system enables a faster frame rate by a factor of a thousand where the frame is defined by the sized WOI, which is smaller than the full array. The fast window frame rate allows FPGA 20 to command the sensor 14 that switches from initial full-array scans to smaller WOIs scans increasing the frame rates from hundreds to thousands of frames per second for mitigating the effects of laser jitter in real or near-real time. The faster window frame rates improves the closed-loop system response of the positioner a factor of hundred from ten Hertz to a hundred Hertz. A series of frames can be captured and the loop rate calculated. The centroid processing time can be greater than 5,000 times faster than one full scan of the focal plane array.

The system is directed to a sensor and controller for detecting and tracking a laser beam by a sensor having increased frame rates. The controller algorithms preferably include pixel data mapping 30, a laser detection algorithm 32, spot size determination 33, a centroid calculation 34, a window of interest sizing 35, and a pointing command generation 36. The system can compensate for influences upon laser jitter. The source of jitter can originate from the originating satellite providing the laser beam. Jitter can be caused by space environment as the laser beam propagates from the originating satellite to the receiving satellite where the focal plane array sensor resides. The laser jitter can be represented as single jitter value. A window of interest allows for the seamless transition to the laser tracking after spot detection. The tracking window of interest can be set to incorporate a laser jitter specification. This jitter specification is translated to the number of laser beamwidths in terms of the number of pixels in either the X or Y directions. The system can be applied to tracking transmitted laser beams and light beacons impinging upon a receiving focal plane array imaging sensor whether operating in the visible or infrared spectrum. The system can operate with light focusing, concentrating, or magnifying telescopic technology. An FPGA can be made large enough with a sufficient number of logic gates so that multiple tracking systems may be hosted in a single FPGA. The FPGA can then support multiple focal plane array imaging sensors to receive multiple laser beams from multiple laser sources. In this manner, a single laser source shall be dedicated to a respective single focal plane array sensor. Those skilled in the art can make enhancements, improvements, and modifications to the invention, and these enhancements, improvements, and modifications may nonetheless fall within the spirit and scope of the following claims.

What is claimed is:

1. A system for increasing frame rates of pixel data of a beam of electromagnetic energy, the system comprising,
an array for receiving the beam, the array is a focal plane array comprising an array of photodetectors as respective pixels, a portion of the photodetectors are illuminated by the beam for providing magnitudes for the respective pixels, the focal plane array scanning the photodetectors in sequence for providing the pixel data including pixel locations within the array and the respective magnitudes, the focal plane array receiving a window command specifying a window for reducing the scan to a number of pixels less than a total number of pixels in the focal plane array, and
a controller for receiving the pixel data and for determining the window from the pixel data and generating the window command for detecting a spot size of the beam within the window, a scan of all of the pixel in the array providing a full scan frame rate, a scan of all of the pixels in the window provides a window frame rate that is higher than the full scan frame rate, the window being sized to detect.

2. The system of claim 1 wherein,
the focal plane array is a focal plane array defining the photodetectors in X coordinates and Y coordinates,
the pixel data comprises the X coordinate and the Y coordinate and an H magnitude, the array being organized in X and Y Cartesian coordinates,
the total number of pixels is equal to X multiplied by Y, and
the array scans the photodetectors in sequence as a raster scan within the window.

3. The system of claim 1 wherein,
the pixels are determined by the controller to be detected pixels when illuminated by the beam and when the respective magnitudes exceed a predetermined threshold value.

4. The system of claim 1 wherein,
the pixels are determined by the controller to be detected pixels when illuminated by the beam and when the respective magnitudes exceed an adaptable threshold value.

5. The system of claim 1 wherein,
the pixels are determined by the controller to be detected pixels when illuminated by the beam and when the respective magnitudes exceed an adaptable threshold value, and
the adaptable threshold value is adaptively decreased when all of the pixels in the window are detected pixels.

6. The system of claim 1 wherein,
the pixels are determined by the controller to be detected pixels when illuminated by the beam and when the respective magnitudes exceed an adaptable threshold value, and
the adaptable threshold value is adaptively decreased when a number of the detected pixels in the window is below a predetermined number.

7. The system of claim 1 wherein,
the pixels are determined by the controller to be detected pixels when illuminated by the beam and when the respective magnitudes exceed an adaptable threshold value, and
the adaptable threshold value is adaptively increased when a number of the detected pixels in the window is above a predetermined number.

8. The system of claim 1 wherein,
the focal plane array is a focal plane array defining the photodetectors in X coordinates and Y coordinates, the array being organized in X and Y Cartesian coordinates,
the pixel data comprises the X coordinate and the Y coordinate and an M magnitude,
the total number of pixels is equal to X multiplied by Y,
the array scans the photodetectors in sequence as a raster scan within the window,
the controller determines the spot size of the beam, the spot size is defined by a number of detected pixels and a top row of pixels and a bottom row of pixels and a left most column of pixels and a right most column of pixels.

9. The system of claim 1 wherein,
the controller determines the spot size of the beam, the spot size is defined by a number of detected pixels and a top row of pixels and a bottom row of pixels and a left most column of pixels and a right most column of pixels, the window is defined by the spot size and a window margin having a top margin and a bottom margin and a left margin and a right margin, the window is defined by the top row plus the top margin and defined by the bottom row plus the bottom margin and defined by the left column plus the left margin and defined by the right column plus the right margin, and the window is raster scanned by the sensor for scanning the pixels in sequence within the window.

10. The system of claim 1 wherein, the controller determines the spot size of the beam, the spot size is defined by a number of detected pixels and a top row of pixels and a bottom row of pixels and a left most column of pixels and a right most column of pixels, the window is defined by the spot size and a window margin having a top margin and a bottom margin and a left margin and a right margin, the window is defined by the top row plus the top margin and defined by the bottom row plus the bottom margin and defined by the left column plus the left margin and defined by the right column plus the right margin, the window is raster scanned by the sensor for scanning the pixels in sequence within the window, and the top margin and the bottom margin and the left margin and the right margin are equal.

11. The system of claim 1 wherein, the controller determines the spot size of the beam, the spot size is defined by a number of detected pixels and a top row of pixels and a bottom row of pixels and a left most column of pixels and a right most column of pixels, the window is defined by the spot size and a window margin having a top margin and a bottom margin and a left margin and a right margin, the window is defined by top row plus the top margin and defined by the bottom row plus the bottom margin and defined by the left column plus the left margin and defined by the right column plus the right margin, the window is raster scanned by the sensor for scanning the pixels in sequence within the window, and the top margin and the bottom margin and the left margins and the right margin are equal.

12. The system of claim 1 wherein, the controller determines a the spot size of the beam, the spot size is defined by a number of detected pixels and a top row of pixels and a bottom row of pixels and a left most column of pixels and a right most column of pixels, the window is defined by the spot size and a window margin having a top margin and a bottom margin and a left margin and a right margin, the window is defined by the top row plus the top margin and defined by the bottom row plus the bottom margin and defined by the left column plus the left margin and defined by the right column plus the right margin, the window is raster scanned by the sensor for scanning the pixels in sequence within the window, and the window in X and Y coordinates encompasses all of the detected pixels.

13. The system of claim 1 wherein, the controller determines the spot size of the beam, the spot size is defined by a number of detected pixels and a top row of pixels and a bottom row of pixels and a left most column of pixels and a right most column of pixels, the window is defined by the spot size and a window margin having a top margin and a bottom margin and a left margin and a right margin, the window is defined by the top row plus the top margin and defined by the bottom row plus the bottom margin and defined by the left column plus the left margin and defined by the right column plus the right margin, the window is raster scanned by the sensor for scanning the pixels in sequence and within the window, the spot size defines a beam width, and the top margin and the bottom margin and the left margin and the right margin are adaptively increased to increase the size of the window to encompass a number of pixels defining a predetermined number of the beam width.

14. The system of claim 1 wherein, the controller computes a centroid from the pixel data of detected pixels within the window.

15. The system of claim 1 wherein, the controller computes a centroid from the pixel data of detected pixels within the window, and the centroid provides a central X and Y location within the window for indicating a center position of the spot size within the window.

16. The system of claim 1 wherein, the controller computes a centroid from the pixel data of detected pixels within the window, and the centroid provides a central X and Y location within the window for indicating a center position of the spot size within the window, the system further comprising, a positioner for pointing the array towards a source of the beam, the controller generating pointing commands from the centroid communicated to the positioner.

17. The system of claim 1 wherein, the controller computes a centroid from the pixel data of detected pixels of the spot size within the window, and the centroid provides a central X and Y location within the window for indicating a center position of the spot within the window, the system further comprising, a positioner for pointing the array towards a source of the beam, the controller generating pointing commands from the centroid communicated to the positioner for tracking the beam for retaining the spot of detected pixels within the window.

18. The system of claim 1 wherein, the controller continuously tracks pixels illuminated by the beam and within the window.

19. The system of claim 1 wherein, the controller first commands the array to scan all pixels within the window, the controller continuously tracks pixels illuminated by the beam and within the window by adjusting the window to continuously encompass pixels illuminated by the beam, and the controller commands the array to fully scan all pixels in the array when all the pixels in the window are not illuminated by the beam.

20. A system for increasing frame rates of pixel data of a beam of electromagnetic energy, the system comprising, an array for receiving the beam, the array is a focal plane array comprising an array of photodetectors as respective pixels, a portion of the photodetectors are illuminated by the beam for providing magnitudes for the respective pixels, the focal plane array scanning the photodetectors in sequence for providing the pixel data including pixel locations within the array and the respective magnitudes, the focal plane array receiving a window command specifying a window for reducing the scan to a number of pixels less than a total number of pixels in the focal plane array, and a controller for receiving the pixel data and for determining the window from the pixel data and generating the window command for detecting a spot size of the beam, a scan of all of the pixel in the array providing a full scan frame rate, a scan of all of the pixels in the window provides a window frame rate that is higher than the full scan frame rate, the window being sized to detect, the controller computing a centroid from the pixel data of detected pixels within the window.

* * * * *